US008800684B2

(12) United States Patent
Krueger et al.

(10) Patent No.: US 8,800,684 B2
(45) Date of Patent: Aug. 12, 2014

(54) METHOD AND APPARATUS FOR BOREHOLE POSITIONING

(75) Inventors: Volker Krueger, Celle (DE); Johannes Witte, Braunschweig (DE)

(73) Assignee: Baker Hughes Incorporated, Houston, TX (US)

( * ) Notice: Subject to any disclaimer, the term of this patent is extended or adjusted under 35 U.S.C. 154(b) by 399 days.

(21) Appl. No.: 12/964,056

(22) Filed: Dec. 9, 2010

(65) Prior Publication Data

US 2011/0139507 A1 Jun. 16, 2011

Related U.S. Application Data

(60) Provisional application No. 61/285,349, filed on Dec. 10, 2009.

(51) Int. Cl.
*E21B 47/022* (2012.01)
(52) U.S. Cl.
USPC .......................................... 175/45; 166/255.2
(58) Field of Classification Search
USPC ........ 175/45, 61, 62; 166/255.1, 255.2, 254.1
See application file for complete search history.

(56) References Cited

U.S. PATENT DOCUMENTS

| | | | |
|---|---|---|---|
| 4,003,017 A | 1/1977 | Bailey | |
| 4,460,059 A | 7/1984 | Katz | |
| 5,273,111 A | 12/1993 | Brannan et al. | |
| 5,485,089 A | 1/1996 | Kuckes | |
| 5,541,517 A | 7/1996 | Hartmann et al. | |
| 6,100,696 A | 8/2000 | Sinclair | |
| 6,662,872 B2 | 12/2003 | Gutek et al. | |
| 7,063,174 B2 | 6/2006 | Chemali et al. | |
| 7,475,741 B2 * | 1/2009 | Waters | 175/45 |
| 7,568,532 B2 * | 8/2009 | Kuckes et al. | 175/40 |
| 7,714,585 B2 | 5/2010 | Nikitenko et al. | |
| 8,164,476 B2 * | 4/2012 | Hache et al. | 340/854.4 |
| 2003/0016020 A1 | 1/2003 | Gianzero | |
| 2003/0035639 A1 | 2/2003 | Okuno | |
| 2003/0051914 A1 | 3/2003 | Bittar | |
| 2004/0240320 A1 * | 12/2004 | McDonald et al. | 367/25 |

(Continued)

FOREIGN PATENT DOCUMENTS

| | | |
|---|---|---|
| CA | 2746078 | 12/2009 |
| WO | 2009073008 A1 | 6/2009 |
| WO | WO2009073008 A1 | 6/2009 |

OTHER PUBLICATIONS

PCT/US2010/059709; PCT Notification of Transmittal of the International Search Report and the Written Opinion of the International Searching Authority, or the Declaration, Jul. 28, 2011.
Restarick, Henry; "Horizontal Completion Options in Reservoirs with Sand Problems," SPE 29831, SPE Middle East Oil Show, Behrain, Mar. 11-14, 1995, pp. 545-560.

(Continued)

*Primary Examiner* — Nicole Coy
(74) *Attorney, Agent, or Firm* — Cantor Colburn LLP (57) ABSTRACT

A method of drilling boreholes is provided. The method, according to one embodiment, may include drilling a borehole, transmitting a signal into the earth formation, receiving signals at least three spaced sensors responsive to the transmitted signals and estimating a path of the borehole using the signals received by the at least three sensors. In another aspect, the method may include drilling a borehole, transmitting signals into the earth formation from at least three spaced transmitters, receiving signals at least one sensor responsive to the transmitted signals and estimating a path of the borehole using the signals received by the at least one sensor.

23 Claims, 8 Drawing Sheets

(56) References Cited

U.S. PATENT DOCUMENTS

| | | |
|---|---|---|
| 2006/0192562 A1 | 8/2006 | Davydychev et al. |
| 2007/0126426 A1 | 6/2007 | Clark et al. |
| 2007/0176842 A1 | 8/2007 | Brune et al. |
| 2007/0278008 A1 | 12/2007 | Kuckes et al. |
| 2008/0197851 A9 | 8/2008 | Forgang et al. |
| 2011/0100712 A1* | 5/2011 | Poedjono .................. 175/45 |

OTHER PUBLICATIONS

Droujinina, A. et al., "Time-Lapse Crosswell Tomography in the Athabasca Tar Sands," SEG Int'l Exposition and Annual Meeting, San Antonio, Texas, Sep. 9-14, 2001, 4 pages.

Canadian Office Action Dated Aug. 29, 2013 for Application No. 2,783,289.

* cited by examiner

FIG. 8

METHOD AND APPARATUS FOR BOREHOLE POSITIONING

CROSS-REFERENCE TO RELATED APPLICATIONS

This application takes priority from U.S. Provisional Patent Application Ser. No. 61/285,349, filed on Dec. 10, 2009.

BACKGROUND OF THE DISCLOSURE

1. Field of the Disclosure

This disclosure relates generally to apparatus and methods for drilling wellbores for production of hydrocarbons.

2. Background of the Art

Wellbores (or boreholes) are drilled in earth formations to develop reservoirs for the production of hydrocarbons (oil and gas). It is often desirable to drill multiple wellbores in a formation in predetermined relationships to an existing well. For example, it is sometimes desirable to drill a number of closely spaced horizontal wellbores for recovery of hydrocarbons from a reservoir. A variety of methods, including seismic, magnetic and electromagnetic methods, have been used for drilling such multiple wellbores.

The magnetic methods generally fall into two categories. In the first category, referred to as active ranging, a source of AC magnetic field and a magnetic sensor are placed in different wells. The source may be a solenoid placed in a production wellbore or an electric current injected in the production well casing. The magnetic field produced by the current in the casing is measured in a drilling well spaced from the production wellbore. The active ranging approach can often offer a good accuracy of measurements, but requires access to a pre-existing wellbore.

In the second category, referred to as passive ranging techniques, access to a pre-existing well is not required for drilling additional wellbores. The passive ranging techniques normally utilize a relatively strong magnetism induced in the casing of the pre-existing well by the Earth's magnetic field. The measured signal due directly to the earth's magnetic field is a problem, limiting the accuracy of this measurement. Residual magnetism of the casing introduces additional noise in the measured signal.

The active magnetic ranging and seismic methods generally utilize sensors in a previously drilled wellbore and sources in the wellbore being drilled. The signals generated by the sources are received by the sensors and processed to give the location of the well being drilled relative to the preexisting well. Alternatively, the signal sources may be placed in the preexisting wellbore and the sensors in the wellbore being drilled. This requires instrumentation in both wellbores, synchronization of clocks in both wellbores and extensive use of telemetry resources.

The present disclosure provides apparatus and methods for drilling wellbores that address some of the above-noted issues.

SUMMARY OF THE DISCLOSURE

In aspects, apparatus and methods for drilling boreholes is provided. The method according to one embodiment may include drilling a borehole, transmitting a signal into the earth formation, receiving signals at least three spaced apart sensors responsive to the transmitted signals and estimating a path of the borehole using the signals received by the at least three sensors. The method according to another embodiment may include drilling a borehole, transmitting signals into the earth formation from at least three spaced transmitters, receiving signals at least one sensor responsive to the transmitted signals and estimating a path of the borehole using the signals received by the at least one sensor. In aspects, the transmitted signals may include acoustic signals, electromagnetic signals and magnetic signals.

Examples of certain features of drilling multiple boreholes are summarized rather broadly in order that the detailed description thereof that follows may be better understood. There are, of course, additional features of the methods and apparatus disclosed hereinafter that form the subject of the claims appended hereto.

BRIEF DESCRIPTION OF THE FIGURES

For detailed understanding of the present disclosure, references should be made to the following detailed description of the preferred embodiment, taken in conjunction with the accompanying drawings, in which like elements have been given like numerals and wherein:

FIG. 3 illustrates azimuthal dependence of the signal in the sensor coil;

DETAILED DESCRIPTION OF THE DISCLOSURE

Figure 1:
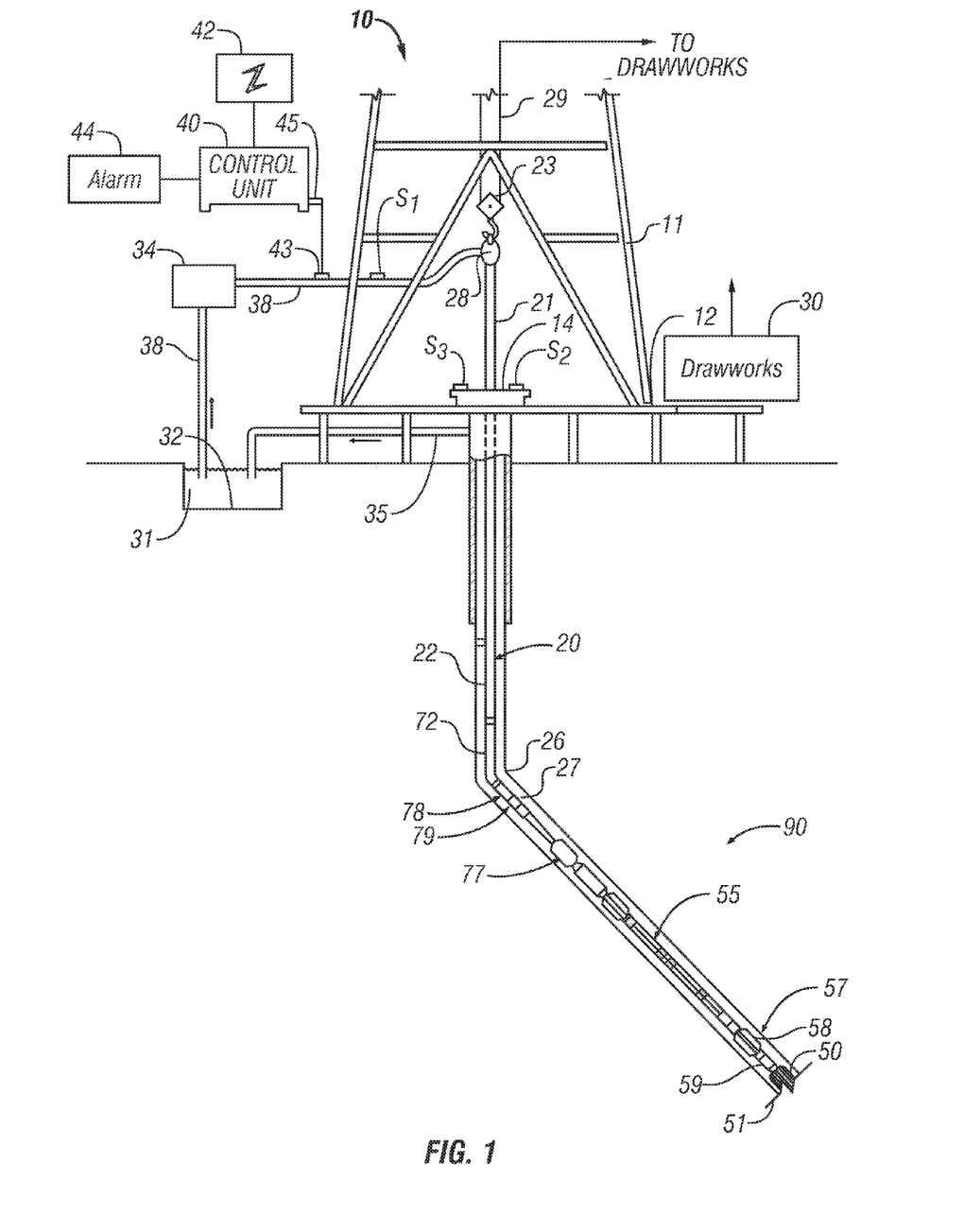
FIG. 1 is a schematic illustration of a drilling system suitable for use with the present disclosure.

FIG. 1 shows a schematic diagram of a drilling system 10 with a drill string 20 carrying a drilling assembly 90 (also referred to as the bottomhole assembly, or "BHA") conveyed in a "borehole" or "borehole" 26 for drilling the borehole. The drilling system 10 includes a conventional derrick 11 erected on a floor 12 which supports a rotary table 14 that is rotated by a prime mover such as an electric motor (not shown) at a desired rotational speed. The drill string 20 includes a tubing such as a drill pipe 22 or a coiled-tubing extending downward from the surface into the borehole 26. The drill string 20 is pushed into the borehole 26 when a drill pipe 22 is used as the tubing. For coiled-tubing applications, a tubing injector, such as an injector (not shown), however, is used to move the tubing from a source thereof, such as a reel (not shown), to the borehole 26. The drill bit 50 attached to the end of the drill string breaks up the geological formations when it is rotated to drill the borehole 26. If a drill pipe 22 is used, the drill string 20 is coupled to a draw works 30 via a Kelly joint 21, swivel, 28 and line 29 through a pulley 23. During drilling operations, the draw works 30 is operated to control the weight on bit, which is an important parameter that affects the rate of penetration. The operation of the draw works is well known in the art and is thus not described in detail herein.

During drilling operations, a suitable drilling fluid 31 from a mud pit (source) 32 is circulated under pressure through a channel in the drill string 20 by a mud pump 34. The drilling fluid passes from the mud pump 34 into the drill string 20 via a desurger 36, fluid line 28 and Kelly joint 21. The drilling fluid 31 is discharged at the borehole bottom 51 through an opening in the drill bit 50. The drilling fluid 31 circulates uphole through the annular space 27 between the drill string 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drill string 20 respectively provide information about the torque and rotational speed of the drill string. Additionally, a sensor (not shown) associated with line 29 is used to provide the hook load of the drill string 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 100. The drilling sensor module processes the sensor information and transmits it to the surface control unit 40 via the telemetry system 72.

The communication sub 72, a power unit 78 and an MWD tool 79 are all connected in tandem with the drill string 20. Flex subs, for example, are used in connecting the MWD tool 79 in the drilling assembly 90. Such subs and tools form the bottom hole drilling assembly 90 between the drill string 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur. The system also includes a downhole processor, sensor assembly for making formation evaluation and an orientation sensor. These may be located at any suitable position on the bottomhole assembly (BHA).

Figure 2:
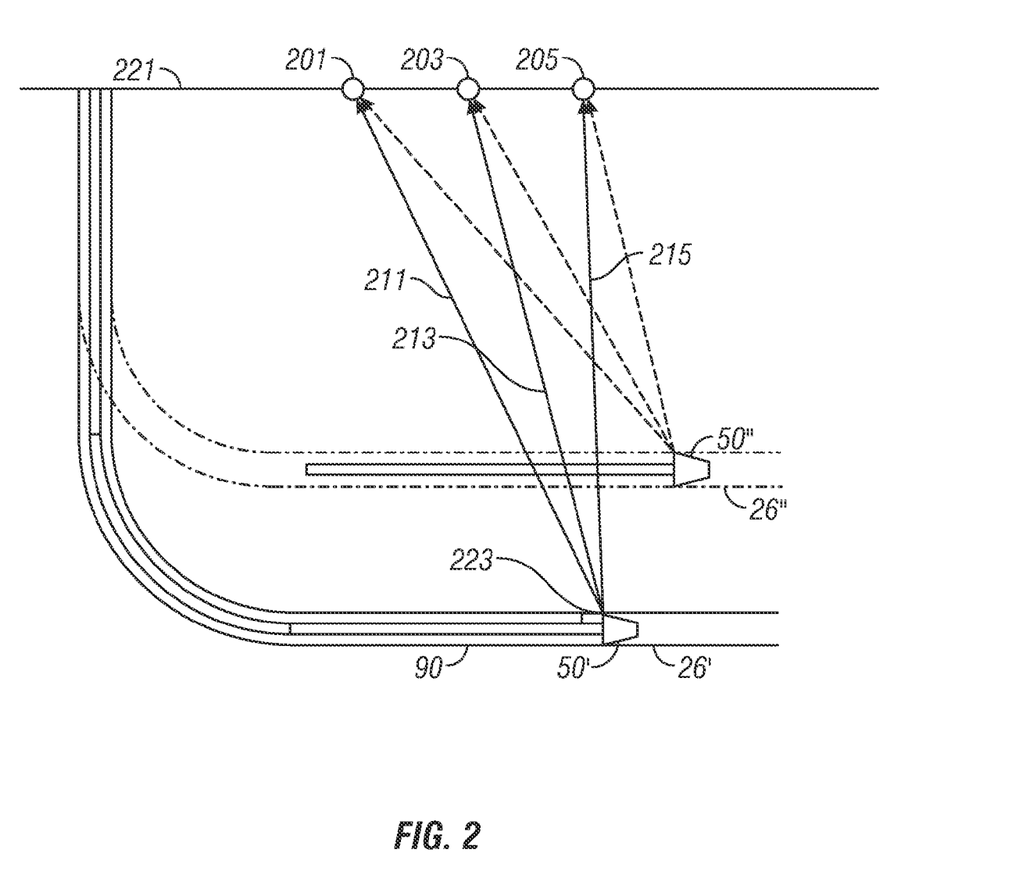
FIG. 2 shows a simplified layout of two vertically spaced apart wells being drilled in the earth formation.

FIG. 2 shows exemplary placement of at least three sensors 201, 203, 205 at or near the surface of the earth 221 for use by the system of FIG. 1 for drilling a number of wells according to this disclosure. Three sensors are shown, but as discussed further, more than three sensors may be utilized in certain applications for drilling wells according to some of the methods described herein. In the exemplary configuration of FIG. 2, the three sensors are shown collinear, though this is not to be construed as a limitation. The deployment of sensors near the surface of the earth is discussed below. In one particular embodiment of the disclosure, the sensors may be seismic sensors such as geophones or accelerometers. In one aspect, the sensors 201, 203, 205 may be multi-component sensors. For the purposes of the present disclosure, the z-axis is vertical, the x-axis is along the line radiating away from the borehole at the surface and the y-axis is transverse to the line radiating away from the borehole at the surface.

FIG. 2 shows a substantially horizontal borehole 26' being drilled. For the purposes of the present disclosure, borehole 26' may be referred to as a reference borehole. An acoustic source 223 placed at a suitable location in the BHA 90 or drill bit 50' is configured to transmit acoustic signals at one or more selected frequencies. Also shown in FIG. 2 are exemplary seismic ray paths 211, 213, 215 from the source 223 to the sensors 201, 203, 205. In another embodiment of the disclosure, the drill bit itself may act as a seismic source. When a repeatable acoustic source is used, estimating the time of arrival of acoustic signals at the sensors is relatively easy and is consistent from one well to another. When the drill bit is used as a seismic source, only differences in travel time to the sensors can be estimated, and may not be repeatable from one well to another. One method of the present disclosure uses the principle of triangulation assuming that the earth between the borehole 26' and the surface 221 is homogenous. The inhomogenous case is discussed further below. Various implementations are possible, depending upon the actual configuration of the system.

In one embodiment of the disclosure, the BHA is provided with a clock that is synchronized to the clock for a surface processor used to process the signals from the surface sensors 201, 203, 205. In this case, the travel times for the ray paths 211, 213, 215 are measured. As would be known to those versed in the art, triangulation is based on distances from a plurality of locations. Therefore, knowledge of an acoustic velocity in the subsurface is used to estimate such distances. There are two methods generally used to determine the acoustic velocity in the formation. In one embodiment of the disclosure, actual location of the drill bit 50' may be determined using a borehole survey instrument, such as that carried out using a gyroscope. In some cases, due to the inaccuracies of the measurement of travel times, each of the rays 211, 213, 215 may provide a different velocity. An average of these velocities may be used as being representative of the formation velocities.

In other aspects, the transmitter may be an electromagnetic transmitter and the sensors may be coils. In another aspect, the transmitter may be a magnetic transmitter and may comprise a rotating transmitter or a non-rotating transmitter and the sensors may be magnetometers. In yet another aspect three or more spaced transmitters may be used to transmit the desired signals into the earth formation and one or more sensors may be used to receive signals responsive to such transmitter. The signals received by one or more sensors are then used to estimate the borehole path.

Figure 3:
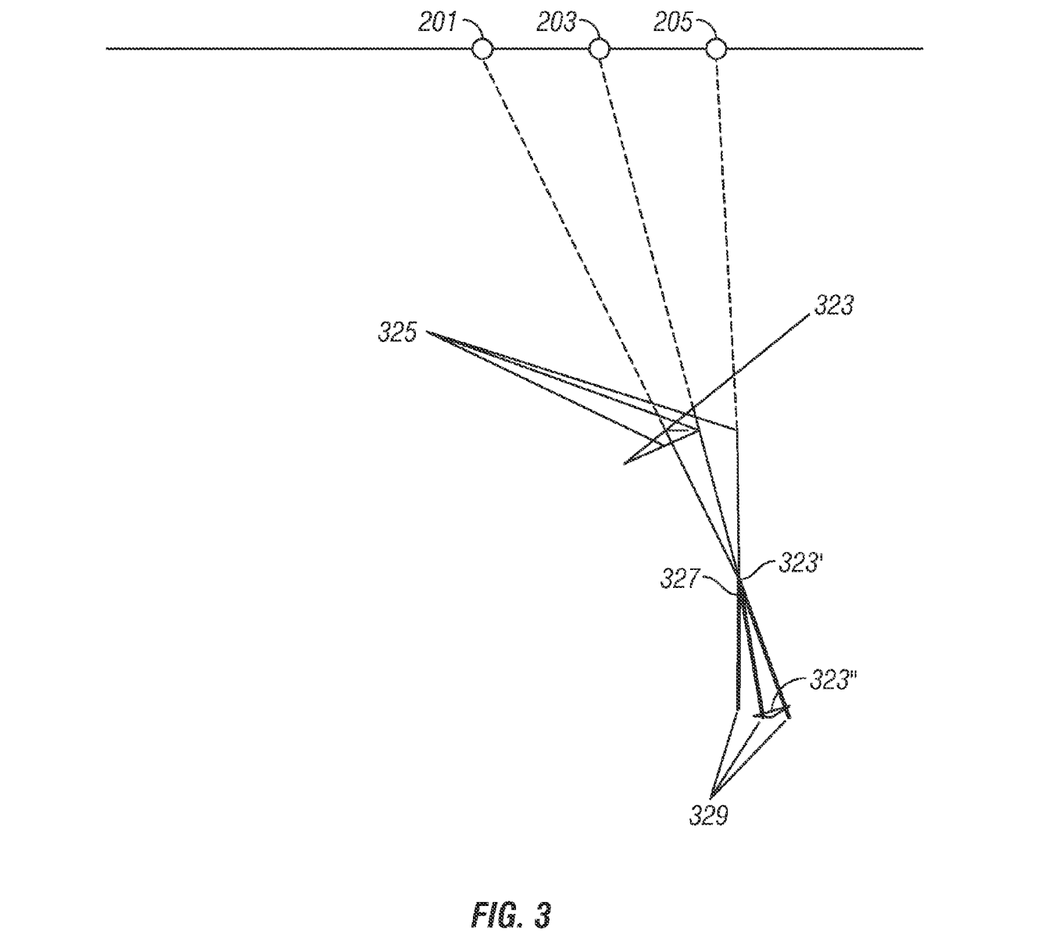
FIG. 3 shows the effect of triangulating with different trial velocities.

In other aspects, triangulation may be carried out with a trial velocity for the subsurface. If the trial velocity is different from the actual velocity of the subsurface, there will be an error associated with the triangulation. FIG. 3 shows that when too low a trial velocity is used, a triangle of uncertainty 323 results in the vertical plane through the sensors, and when too high a velocity is used, a triangle of uncertainty 323" results in the vertical plane through the sensors. With the correct velocity, the source point 223 is imaged at point 323' with little uncertainty. In FIG. 3, the points 325, 327 and 329 define the raypaths extrapolated backwards from the sensors with three different velocities. The triangle 323 is defined by the intersection of circles (not shown) centered at the respective sensors with radius given by the points 327. Similarly, with a higher velocity, the intersection of circles with radii defined by the points 323' defines the point 327 as the correct velocity is used. When the trial velocity is too high, the triangle of uncertainty is 329. To simplify the illustration, the circles have not been indicated.

When a synchronized clock is not available, then the drift between the surface clock and the downhole clock may be treated as an unknown quantity and triangulation may be carried out with different values of the drift to minimize the size of the error triangle as discussed above with different trial velocities. When both the velocity and the drift are unknown, a two-dimensional search may be utilized. Also, data from additional sensors may be used to improve accuracy of results.

Those versed in the art would recognize that triangulation that is not constrained to a vertical plane will provide two source locations away from and on opposite sides of the vertical plane through the sensor. In such a case, it is desirable to utilize an additional sensor laterally displaced in the y-direction from the x-axis to resolve the ambiguity. Alternatively, by using multi-component sensors, directional information for ray arrivals away from the vertical plane that includes the x-axis may be obtained to pinpoint the location of the source.

Once the velocity of the subsurface has been determined, it may then be used for controlling the direction of drilling of a borehole 26" spaced apart from the reference borehole 26'. During drilling operations, seismic signals measured at the sensors 201, 203, 205 are monitored to determine arrival times for rays such as 211, 213 and 215. Using the determined formation velocity, the location of the drill bit 50" can be determined and appropriate action can be taken to maintain the borehole 26" in the desired relation to the reference borehole 26'. If the borehole 26" is to be placed vertically above the reference borehole 26", use of three component sensors may show whether the signal is coming out of the vertical plane so that a remedial action may be taken.

Figure 4:
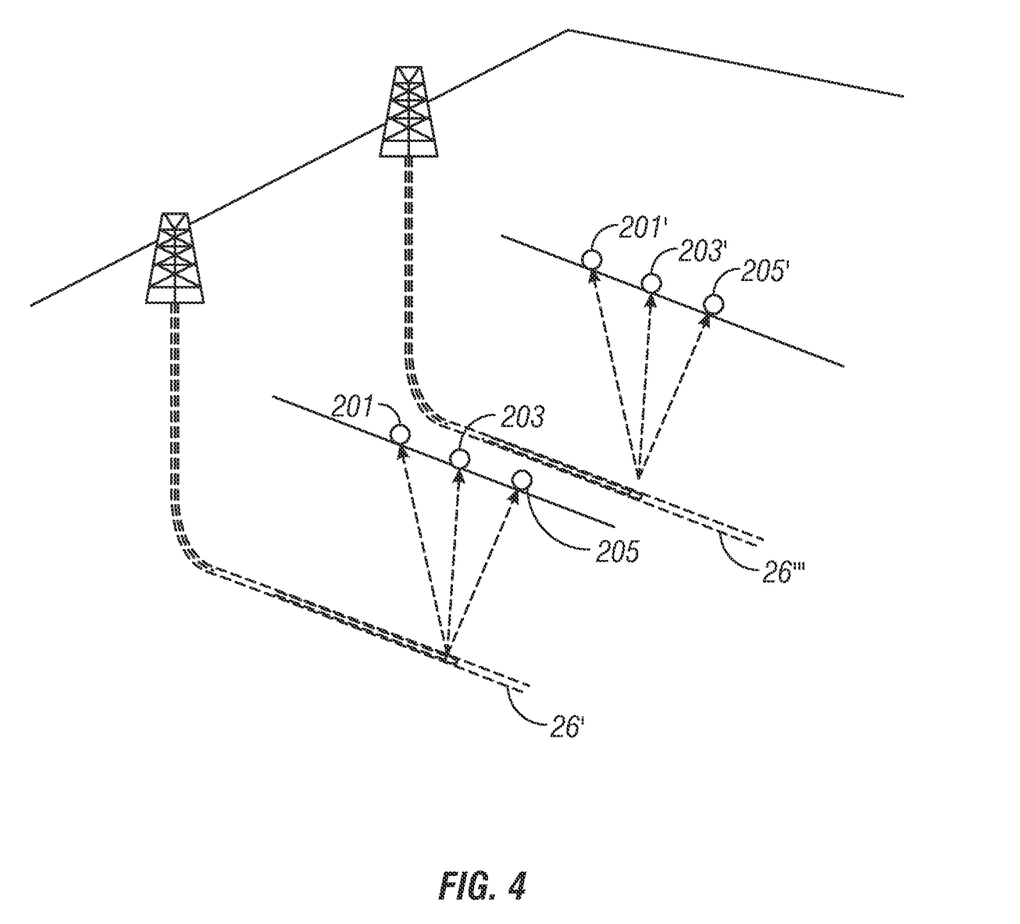
FIG. 4 shows two spaced apart wells at the same location.

The methods described above may also be used when the second borehole 26'" is to be laterally displaced from the reference borehole 26' and at the same depth as the reference borehole. This is illustrated in FIG. 4 where the second borehole 26'" is shown laterally displaced from the reference borehole 26'. In FIG. 4, the two boreholes 26' and 26'" are shown being drilled from two different rigs, but they may be drilled using the same rig. Sensors 201', 203' and 205' are shown for drilling the second borehole 26'", but if the lateral spacing between the boreholes is small, then the sensors 201, 203 and 205 may be used to locate the borehole 26'".

Figure 5:
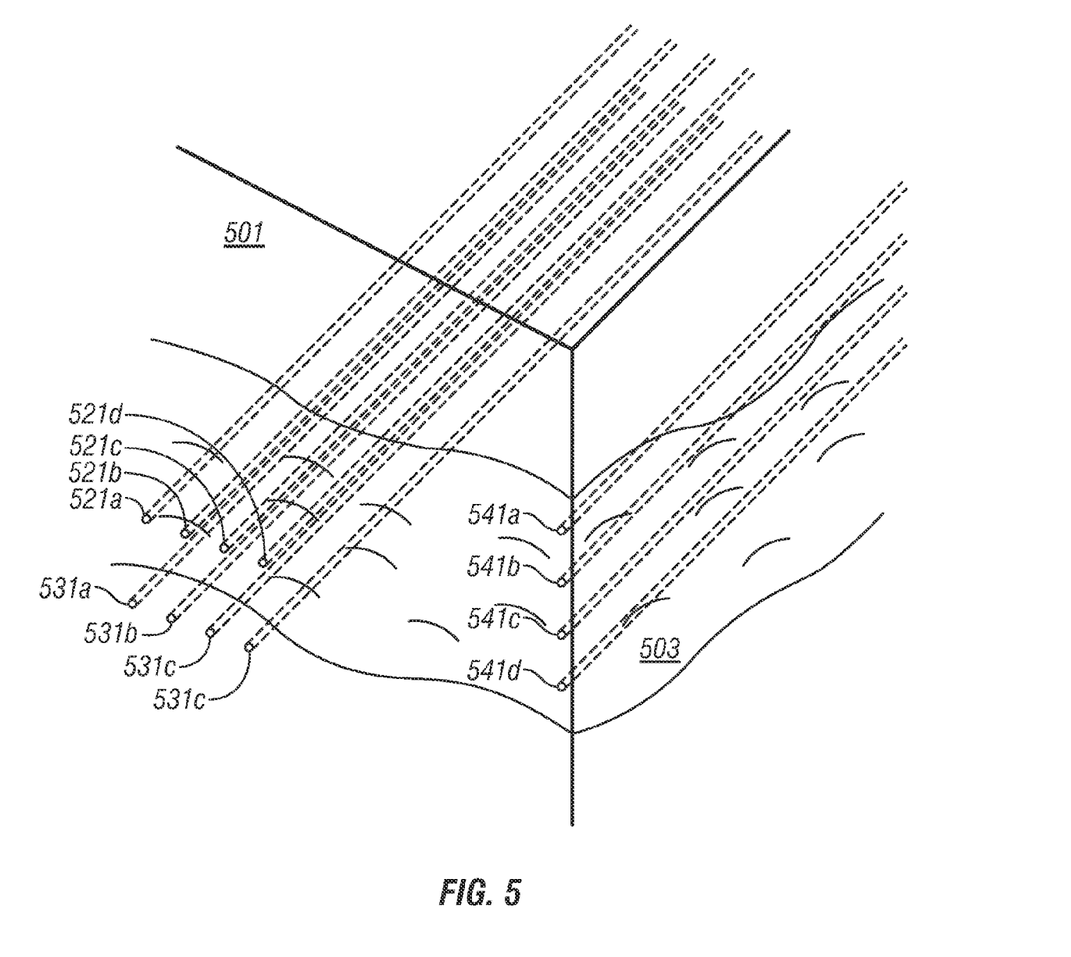
FIG. 5 shows an arrangement of spaced apart wells for recovery of hydrocarbons from tar sands.

A particular application of horizontally and vertically spaced wells is illustrated in FIG. 5. Shown therein is a cutaway portion of the earth's subsurface 501 that includes tar sand deposits depicted by 503. Horizontal wells 521a, 521b, 521c, 521d . . . are drilled in the tar sand deposits. These are termed production wells. Under normal conditions, the tar sands are very viscous and will not flow into the production wells 521a, 521b, 521c, 521d . . . . In order to facilitate the flow of hydrocarbons into the production wells, secondary (or additional) boreholes 531a, 531b, 531c, 531d . . . may be drilled to heat the formation 503 to aid the tar sand to flow into the production boreholes 521a-521d. In one aspect, steam may be used to heat secondary boreholes, thereby heating the hydrocarbons in the reservoir 503 to reduce the viscosity of the hydrocarbons, enabling flow of such hydrocarbons into the production boreholes 521a, 521b, 521c, 521d . . . . Other methods of heating the secondary boreholes 531a-531d may include, but, are not limited to, using resistance heat and circulation of hot fluids through the secondary boreholes. Some or all of the secondary boreholes 531a-531d may be placed below the reservoir 503 and/or in the reservoir. The production boreholes and the secondary boreholes may all be positioned using the methods of the present disclosure. In some aspects, the secondary boreholes may be parallel horizontal boreholes placed relatively close to each other (such as between 5 to 15 meters). The spacing between the vertical sections of such boreholes may also be relatively small, such as 10 meters.

In order to avoid lateral flow of the heated hydrocarbons, additional cooling wells, such as wells 541a, 541b, 541c, 541d . . . , may be formed to aid the fluid from the reservoir to the production wells. In one aspect, the cooling wells may be formed along on or more sides of the reservoir 503. The number and location of the cooling wells is chosen so that when such wells are cooled, such as by circulating cold water through such wells, they will aid the heated fluid in the reservoir 503 to flow toward the production wells 521a-521d. Cold water may be pumped through the cooling wells to maintain the high viscosity of the hydrocarbons near the edge of the reservoir and inhibit lateral flow.

The methods described above in reference to acoustic sensors may also be utilized for electromagnetic (EM) signals. In such cases, the sensor 223 may be a pulsed EM source. By using at least three, at least three measurements of amplitude difference (and/or phase difference) can be obtained for the EM signals received by the at least three receivers from the EM source. Instead of the velocity of the subsurface being an unknown quantity, the EM method estimates either the amplitude attenuation per unit distance and/or the phase shift per unit distance in the formation. When determining the phase difference between received signals at two locations, there can be an inherent ambiguity of a multiple of $2\pi$ radians in the estimated phase difference. In the present case, even with a frequency of 10 MHz, the wavelength of the EM signal is 30 m, so that when the source depth is typically 300 m, the differences in path length will commonly be less than 1 wavelength; hence the phase difference is known to be within $2\pi$ radians and the problem of a multiple of $2\pi$ uncertainty in phase is not present. At lower frequencies, the phase differences are considerable less than $2\pi$.

Figure 6:
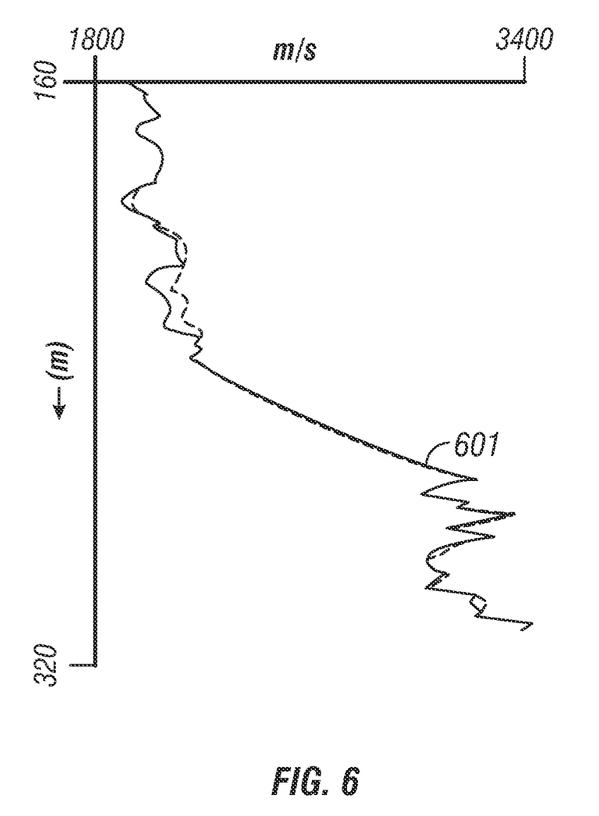
FIG. 6 shows compressional wave velocities measured in and above an exemplary tar sand.

Another embodiment of the disclosure addresses the possible limitation of assuming a homogenous velocity model for the subsurface. FIG. 6 shows exemplary prior art measurements of compressional wave velocities 601 measured in and above the tar sands.

Another embodiment of the disclosure addresses the situation when the formations are non-homogeneous. FIG. 6 shows exemplary measurements of compressional wave velocities 601 measured in and above the tar sands. For this particular location, the sediments above the tar sands have a velocity of around 2000 meters/second while the tar sands have a velocity of around 3000 meters/second. Those versed in the art and having benefit of the present disclosure would recognize that in such a case, the triangulation method discussed above may not provide accurate results. Accordingly, one embodiment of the disclosure addresses this potential source of error. One embodiment of the disclosure addresses this potential source of error, as described below in reference to FIG. 7.

Figure 7:
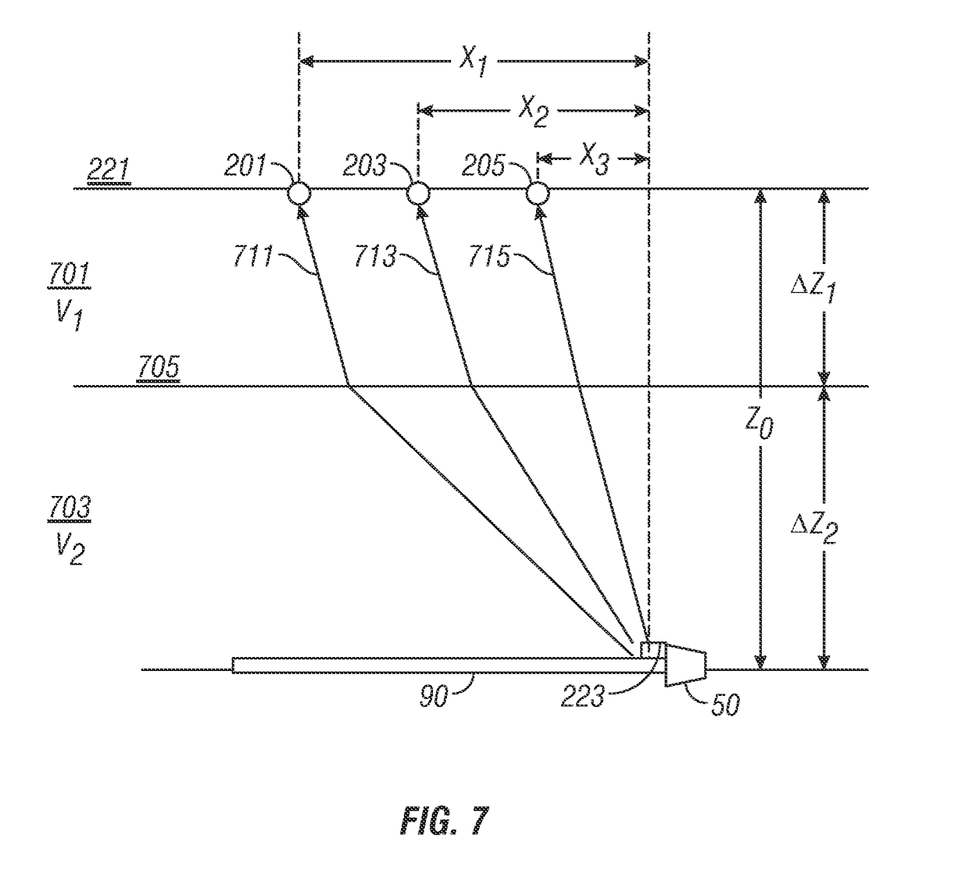
FIG. 7 shows ray paths for a two-layer model illustrating an alternate embodiment of the disclosure.

FIG. 7 shows BHA 90, the drill bit 50 and a seismic source 223 near the bottom of a sand tar 703. The acoustic velocity in the sand tar 703 is $V_2$, which for example may be 3000 meters/second. Above the tar sand 703 are sediments 701 having an acoustic velocity $V_1$, which for example may be 2000 meters/second. These values are for exemplary purposes only and in practice, actual measurements made in wells or from seismic surveys would typically be used. The location of the top of the tar sands 705 is generally known (determined from vertical wells drilled). Due to the velocity contrast at the interface 705, the acoustic rays 711, 713, 715 from the source 223 to the sensors 201, 203, 205 bend at the interface 705. This bending of the acoustic rays can cause errors in triangulation method of estimating the distances from the source to the receivers. The travel times of the individual rays $T_i$ may be expressed by the normal moveout (NMO) relation:

$$T_i^2 = T_0^2 + \frac{x_i^2}{V_e^2}, \quad (1)$$

where $T_0$ is the traveltime for a vertical raypath, $x_i$ is the offset of the i-th receiver from a point vertically above the source 223 and $V_e^2$ is a mean squared velocity defined in equation (2) below. The vertical distance between the source and the surface 221 is denoted by $z_0$.

In equation (1), $T_0$, $V_e$ and one of the $x_i$ are unknown quantities. For example, if $x_1$ is considered unknown, then $x_2$ and $x_3$ have a known relation to the unknown $x_1$ and can thus be estimated by a suitable curve fitting techniques from the measurements of $T_i$. The following relations may then be used to determine the value of z with some redundancy:

$$T_0 = \frac{z}{V_{av}} = \frac{\Delta z_1 + \Delta z_2}{V_{av}}, \quad (2)$$

$$V_{av} = \frac{z}{\int \frac{dz}{V}} = \frac{\Delta z_1 + \Delta z}{\frac{\Delta z_1}{V_1} + \frac{\Delta z_2}{V_2}}$$

$$V_e^2 = \frac{\int V dz}{\int \frac{dz}{V}} = \frac{V_1 \Delta z_1 + V_2 \Delta z_2}{\frac{\Delta z_1}{V_1} + \frac{\Delta z_2}{V_2}}.$$

Where, $\Delta z_1$ and $\Delta z_2$ are the thicknesses of the layers 701 and 703 respectively, as shown in FIG. 7. $T_0$ and $V_e$ may be measured from the traveltimes. If the values of $V_1$ and $\Delta z_1$ are known, then $V_2$ and $\Delta z_2$ can be calculated. When $V_2$ is known from previous wells, then a redundant set of equations for $\Delta z_2$ may be obtained. Back substitution into eqn. (1) also provides the b value for $x_i$ and thus the location of the source 223. Using additional sensors provides a redundant data set, which may be used to improve the resolution of the location of the source 223. The estimated velocity can then be used for processing measurements made in other wells (horizontally or vertically separated from the reference well) for estimating their location. As with the embodiments discussed above, the signal in the transverse component of a 3-component geophone is diagnostic of deviation from the vertical plane and can thus be used to control the azimuth of the borehole.

Figure 8:
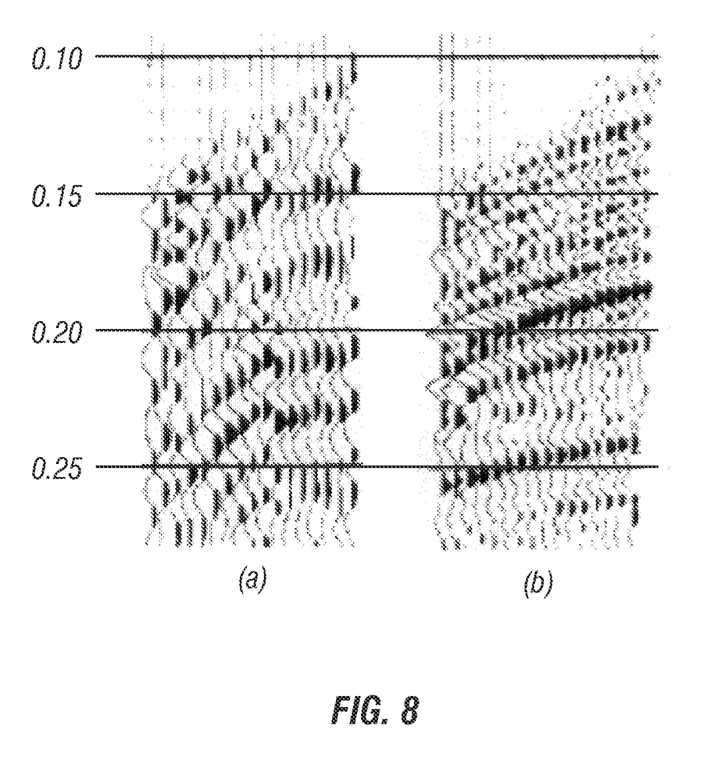
FIG. 8 shows a comparison of signals measured by (a) surface seismometers and (b) buried seismometers.

It is known in the art that there are many locations where there is a near surface weathered layer with large variations in compressional wave velocity along with relatively high absorption. This also may be true of some locations over tar sands. FIG. 8a shows a common midpoint (CMP) gather of surface seismic data acquired at one such location using surface seismometers 8 meters apart. The abscissa is the source-receiver distance and the ordinate is time. FIG. 8b shows a CMP gather of surface seismic data acquired at the same location using seismometers buried 10 meters deep. The former shows large variations in travel time for the small spacing of 8 meters. In addition, the frequency content of the signals in FIG. 8a is lower than that in FIG. 8b. For the purposes of the present disclosure, the weathered layer may be considered part of the near surface of the earth, and sensors within or at the bottom of the weathered layer are may be defined as sensors "near the surface of the earth." In aspects, the geometry in the present disclosure is one-half of that in surface seismic acquisition, so that in many cases, it would be desirable to have buried seismometers to improve the detectability of the signals as well as improve the accuracy of the estimation of borehole location.

Common to the different embodiments of the disclosure is using measurements from a reference well to estimate an unknown parameter (velocity) of the subsurface, and using this determined velocity to process measurements made in later wells for estimating the location of the later wells.

The processing of the data may be done by a downhole processor to give corrected measurements substantially in real time. Implicit in the control and processing of the data is the use of a computer program on a suitable machine readable medium that enables the processor to perform the control and processing. The machine readable medium may include ROMs, EPROMs, EEPROMs, Flash Memories and Optical disks.

Thus in aspects, the method according to one embodiment may include drilling a borehole, transmitting a signal into the earth formation, receiving signals at at least three spaced apart sensors responsive to the transmitted signals and estimating a path of the borehole using the signals received by the at least three sensors. The method according to another embodiment may include drilling a borehole, transmitting signals into the earth formation from at least three spaced transmitters, receiving signals at the at least one sensor responsive to the transmitted signals and estimating a path of the borehole using the signals received by the at least one sensor. In aspects, the transmitted signals may include acoustic signals, electromagnetic signals and magnetic signals.

The method according to yet another embodiment of the disclosure may include: drilling a first borehole; transmitting a selected signal into the earth formation from the first borehole; estimating a first path of the first borehole by processing first signals received in response to the selected signal transmitted from the first borehole at the at least three sensors located at or near the surface of the earth; drilling at least one second borehole; transmitting the selected signal from the second borehole; and processing second signals received by the at least three sensors in response to the selected signal transmitted from the second borehole to estimate a second path of the second borehole spaced from the first path. In one aspect, the paths of the boreholes may be estimated using a triangulation method. In another aspect, the paths of the boreholes may be estimated using a normal moveout velocity. In one aspect, the method may further include altering a direction of drilling of the at least one second borehole using the estimate of the second path. The transmitted signals may include transmitting an acoustic signal and estimating the first path may include measuring a velocity of an acoustic wave responsive to the transmitted acoustic signal. In another aspect, the selected signal may be an electromagnetic signal and estimating the first path may include measuring attenuation of the transmitted electromagnetic signals. In other aspects, multiples boreholes may be drilled using the method, wherein such boreholes include substantially parallel horizontal sections proximate to a reservoir.

In another aspect, one or more boreholes may be heated to reduce the viscosity of the fluid in the reservoir, thereby aiding the fluid to flow toward one or more production wells. The wells may be heated by any suitable method, including, but not limited to circulating hot a fluid (such as water, gas, steam, etc) in the wellbore and electrically heating the boreholes. The sensors may be multi-component sensors. At least one of the three sensors may be a multi-component sensor to provide an indicator of a deviation of the borehole path from a vertical. In yet another aspect, one or more boreholes may be drilled at suitable places, such as along a boundary of the reservoir, which boreholes may be cooled to inhibit flow of hydrocarbons from the reservoir to undesired directions. In other aspects, at least three transmitters may be used to transmit signals into the earth formation and at least one sensor may be used to receive signals responsive such transmitted signals. The received signals are then processed to estimate the borehole path. In other aspects, only a single borehole may be drilled using the above described system and methods.

While the foregoing disclosure is directed to the preferred embodiments of the disclosure, various modifications will be apparent to those skilled in the art. It is intended that all variations within the scope and spirit of the appended claims be embraced by the foregoing disclosure.

The invention claimed is:

1. A method of forming boreholes in an earth formation, the method comprising:
    drilling a reference borehole in the earth formation;
    transmitting a first signal into the earth formation from a transmitter at a known location in the reference borehole;
    receiving signals at at least three spaced sensors positioned at selected locations responsive to the transmitted first signal;
    estimating a signal velocity in the earth formation utilizing the signals received at the at least three sensors responsive to the transmitted first signal;
    drilling at least one other borehole in the earth formation;
    transmitting a second signal into the earth formation from a transmitter in the at least one other borehole;
    receiving signals at the at least three sensors responsive to the transmitted second signal; and
    estimating a path of the at least one other borehole utilizing the signals received by the at least three sensors responsive to the transmitted second signal and the estimated signal velocity in the earth formation.

2. The method of claim 1, wherein the at least one other borehole is one of: a borehole along a path of known distance from the borehole; and parallel or substantially parallel to the borehole.

3. The method of claim 1 further comprising maintaining a selected spacing between the borehole and the at least one other borehole using the estimated paths of the borehole and the second borehole.

4. The method of claim 1, wherein the transmitted first signal and the transmitted second signal are electromagnetic wave signals.

5. The method of claim 4, wherein the sensors are coils for receiving the electromagnetic wave signals.

6. The method of claim 1, wherein the transmitted first and second signals comprise a magnetic signal from one of a rotating magnet and a non-rotating magnetic and the sensors are magnetometers.

7. The method of claim 1 further comprising utilizing an electromagnetic attenuation to estimate the path of the at least one other borehole.

8. The method of claim 1, wherein the at least one other borehole comprises a plurality of boreholes and wherein each such borehole includes a substantially horizontal or a substantially horizontal section.

9. The method of claim 8, wherein at least two of the plurality of boreholes are spaced apart by a distance between 5 meters and 15 meters.

10. The method of claim 1, further comprising estimating the path of the reference borehole and the at least one other borehole using a triangulation method.

11. The method of claim 1, wherein estimating the path of the at least one other borehole comprises using a normal moveout velocity.

12. The method of claim 1 further comprising using a multi-component sensor for at least one of the at least three receivers and using an output of the multi-component sensor as an indicator of deviation of the path of the at least one other borehole from a vertical plane through the at least three receivers.

13. The method of claim 1 further comprising cooling a section of the earth formation to inhibit a flow of a fluid in one of the boreholes along a selected direction.

14. A system configured to form boreholes in an earth formation, the system comprising:
    a first drilling assembly configured to drill a first borehole along a first path;
    a first transmitter configured to transmit a first signal into the earth formation from a known location in the first borehole;
    at least three sensors placed spaced apart from each other at selected locations configured to receive first signals responsive to the transmitted first signal;
    a first processor configured to estimate a signal velocity in the earth formation by processing the first signals received by the at least three sensors; and
    a second transmitter in at least one second borehole configured to transmit a signal, wherein the first processor is configured to process second signals received at the at least three sensors and estimate a path of the second borehole using the received second signals and the estimated signal velocity in the earth formation.

15. The system of claim 14 further comprising a second drilling assembly configured to drill the at least one second borehole along the second path and transmit the second signal into the earth formation; and
    a second processor configured to process the second signals received by the at least three sensors responsive to the transmitted second signal and estimate the second path using the received second signals.

16. The system of claim 15, wherein the second processor is further configured to alter a direction of drilling of the at least one second borehole using the estimate of the second path.

17. The system of claim 14, wherein the transmitted first signal is selected from a group consisting of: an electromagnetic wave signal; and a magnetic signal.

18. The system of claim 14, wherein the first processor is further configured to utilize a triangulation method to estimate the first path.

19. The system of claim 15, wherein the one of the first and second processors is configured to estimate the first path or the second path using a normal moveout velocity.

20. The system of claim 14, wherein at least one of the three sensors is a multi-component sensor and wherein an output of the multi-component sensor is used as an indicator of deviation of the first path from a vertical plane through the at least three sensors.

21. The system of claim 15 further comprising a source configured to convey a high temperature fluid into at least one of the first and second boreholes to reduce a viscosity of a fluid flowing in such borehole.

22. A method of forming boreholes in an earth formation, the method comprising:
   drilling a borehole in the earth formation;
   transmitting signals into the earth formation from at least three spaced transmitters at selected locations;
   receiving signals at at least one sensor responsive to the transmitted signals; and
   estimating a path of the borehole utilizing the signals received by the at least one sensor and a velocity of the signal determined using a signal transmitted between a transmitter from a known location in another borehole and the at least one sensor.

23. The method of claim 22, wherein the signal transmitted into the earth formation is selected from a group consisting of: an electromagnetic wave signal, a magnetic signal, and an acoustic signal.

* * * * *